Oct. 15, 1946.　　T. P. SIMPSON ET AL　　2,409,596
METHOD AND APPARATUS FOR REACTIONS IN A CONTACT MASS
Filed June 17, 1942　　3 Sheets-Sheet 2
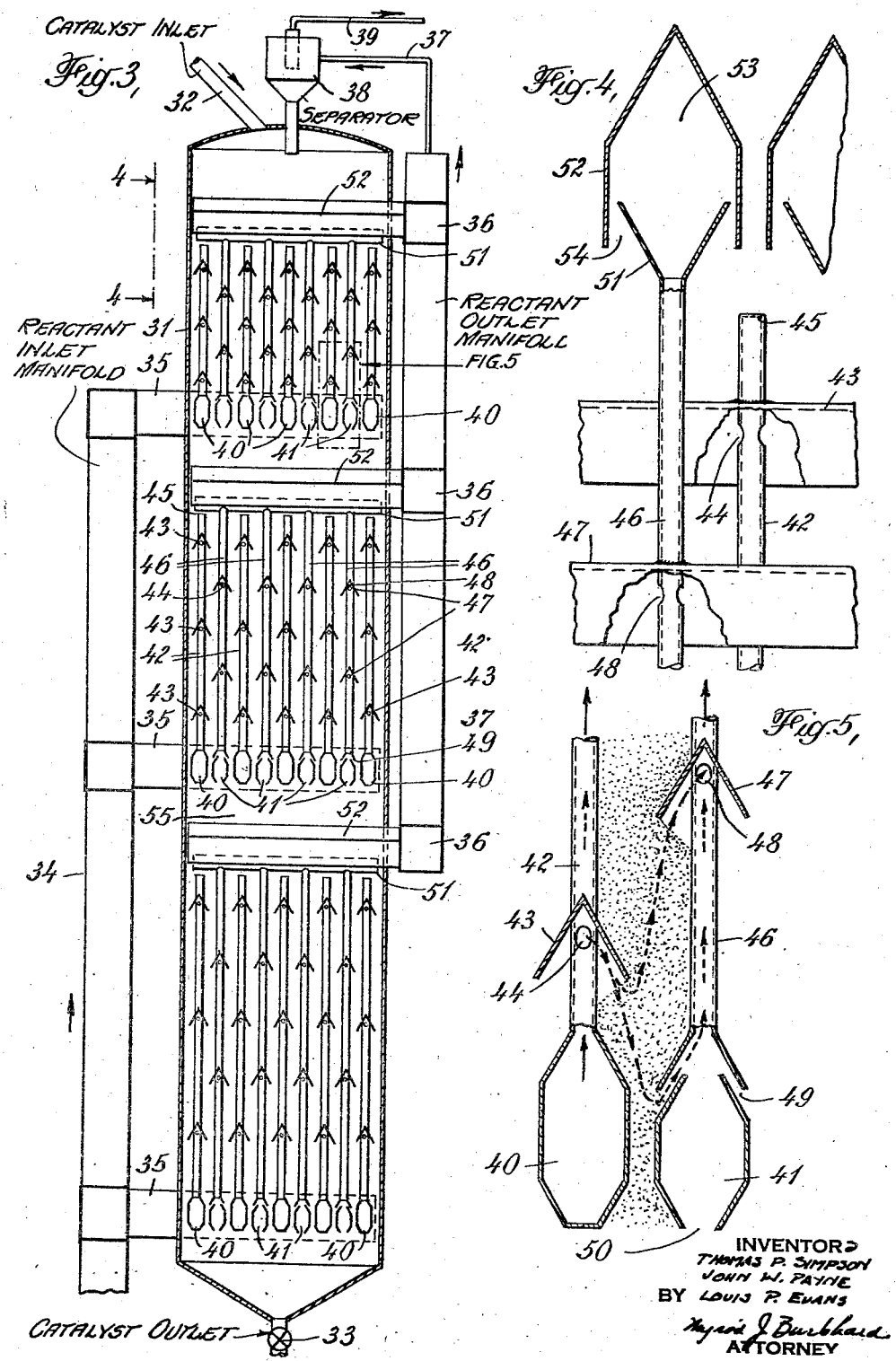

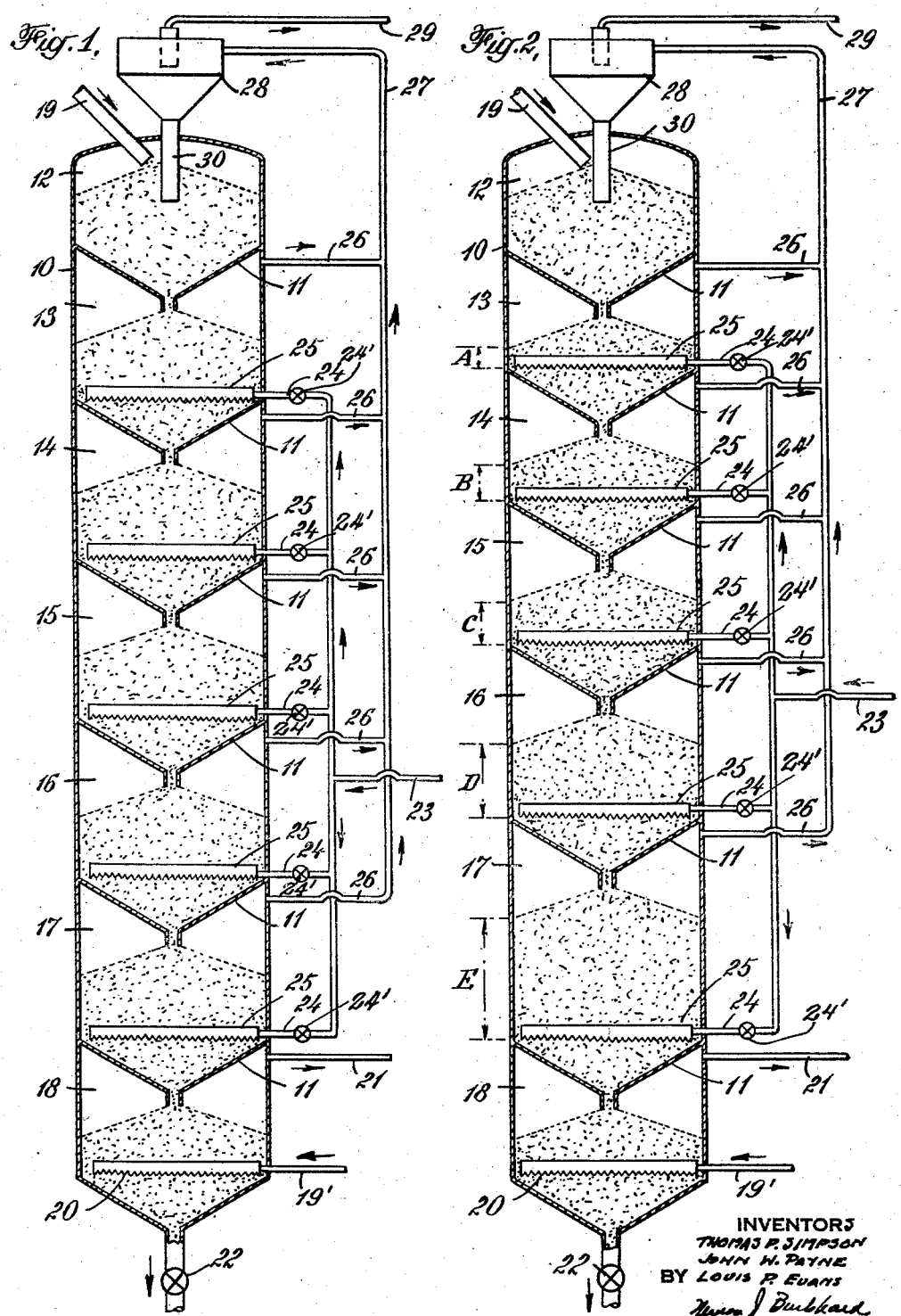

Oct. 15, 1946.  T. P. SIMPSON ET AL  2,409,596
METHOD AND APPARATUS FOR REACTIONS IN A CONTACT MASS
Filed June 17, 1942  3 Sheets-Sheet 3
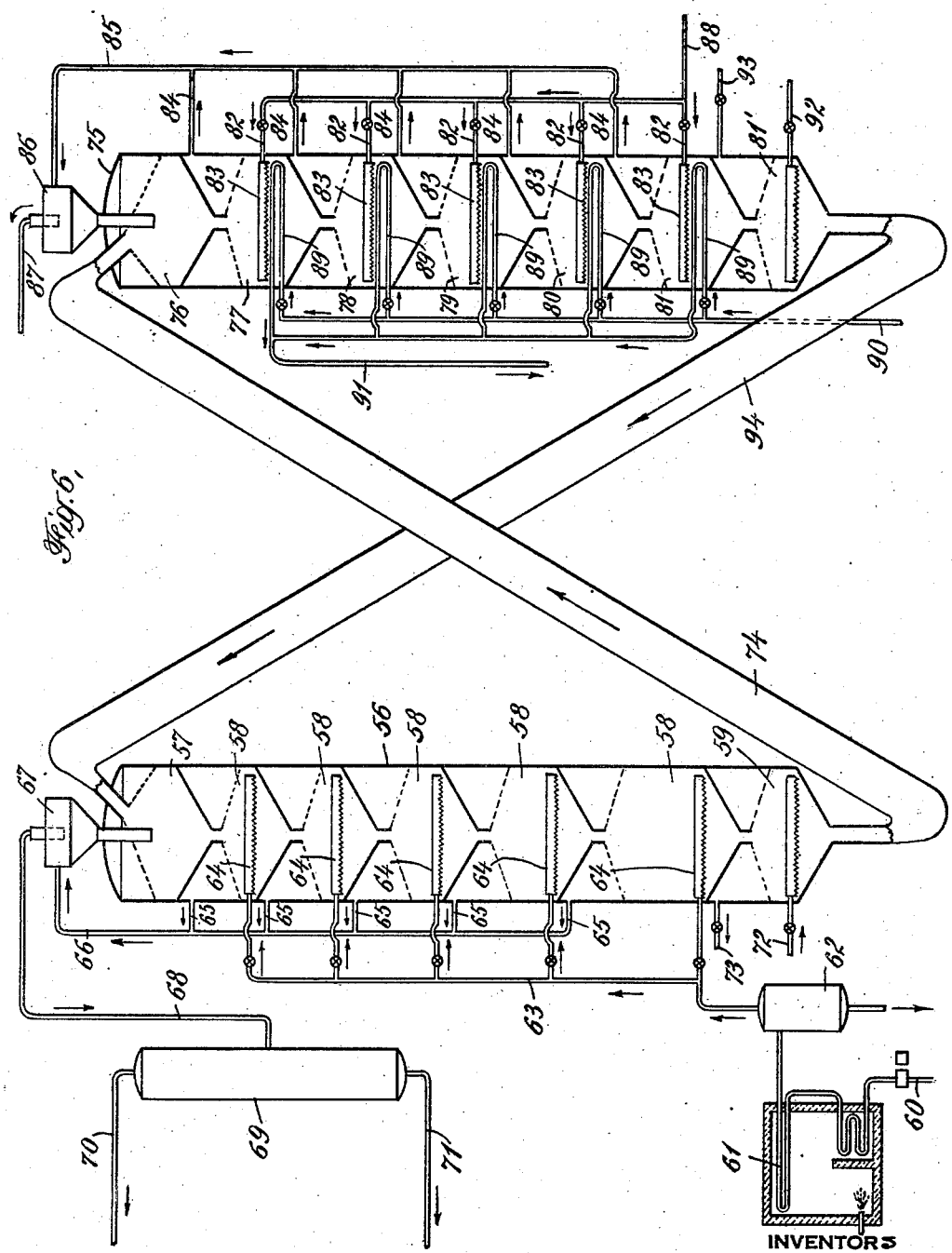
INVENTORS
THOMAS P. SIMPSON
JOHN H. PAYNE
BY LOUIS P. EVANS
Myron J. Burkhard
ATTORNEY Patented Oct. 15, 1946

2,409,596

UNITED STATES PATENT OFFICE 2,409,596

METHOD AND APPARATUS FOR REACTIONS IN A CONTACT MASS

Thomas P. Simpson, John W. Payne, and Louis P. Evans, Woodbury, N. J., assignors to Socony-Vacuum Oil Company, Incorporated, a corporation of New York Application June 17, 1942, Serial No. 447,431

12 Claims. (Cl. 196—52)

This invention has to do with method and apparatus for the conduct of reactions in the presence of a contact mass. In particular it has to do with such vapor phase reactions in the presence of a contact mass as are exemplified by the catalytic conversion of hydrocarbons. It is particularly concerned with methods wherein the contact mass is moved through the reaction zone as contrasted with processes wherein alternate periods of reaction and regeneration are carried out in a bed of catalytic contact mass material which remains in place. In general, such processes take the form of moving a granular or pellet form contact mass material through a reaction zone through which reactant vapors also pass, the contact mass flowing from the zone of reaction to a regeneration operation or other appropriate disposal. While the invention is herein discussed with particular reference to the vapor phase cracking of heavy hydrocarbons to gasoline, it will be realized that such a process is applicable to many vapor phase conversion operations, not only of hydrocarbons but of other materials as well. Consequently, although the discussion is specifically upon the basis of cracking to gasoline, it must be remembered that this is for the purpose of explanation and example only and that the invention is not to be considered as being limited thereto or thereby.

In the present processes of continuous vapor phase cracking in the presence of a contact mass, the vaporous reactants are flowed upwardly through a descending column of contact mass particles. Such reactions are frequently endothermic to a slight degree, as in the gasoline cracking reaction. Such reactions result in the deposit on the contact mass material of a carbonaceous residue usually spoken of as coke. To regenerate the contact mass, this coke is burned off leaving the contact mass material at an elevated temperature and this residual heat is usually used to supply the endothermic heat of reaction, at least to a certain extent. For example, in an operation of this type where the cracking reaction desired is that which normally would occur at a temperature level of about 850° F., the regenerated contact mass enters the top of the column at about 900° F., while the reactant vapors enter the bottom at about 850° F. Obviously the contact mass material near the top of the column has the greatest activity and this activity is increased over the average activity throughout the zone by the higher temperature level. At the bottom the contact mass material is at the lowest temperaure, is most nearly spent and is least active. The space velocity, that is, the units of volume of liquid oil charged per unit of time per unit of clay volume is the same throughout the column. Due to variations in activity, the cracking accomplished throughout the column is not uniform. This does not appear particularly from consideration of the products made, as shown in the reacted material leaving the system, because the manner of operation automatically averages the results of all portions of the system. It does, however, give rise to rather serious problems concerning the most effective utilization of all portions of the contact mass.

This invention has for its principal object the provision of a method of operation wherein a more rational utilization of the contact mass may be made with respect to its varying activity. A very important object is the provision of apparatus forms wherein such a process may be carried out.

A further object is the provision of a unitary system for best use of the contact mass in associated steps of conversion and regeneration, and of a method for the operation of such a system.

In general, this invention takes the form of a multi-stage contacting system comprising a series of stages through all of which the contact mass passes in a continuously flowing stream and in each of which the reactant vapors are introduced, reacted and withdrawn without communication with other spaces and under controls sufficient to iron out the varying activities of the various zones and to effect more complete utilization of the contact mass as a whole. In quite broad terms it may be visualized as a series of longitudinally placed zones through all of which the contact mass flows, with passage of a controlled amount of reactant through each zone.

In order to understand this invention more readily, reference is now made to the drawings attached to this specification in which drawings Figures 1, 2 and 3 show in diagram form a series of reactors adapted for the practice of this invention, Figures 4 and 5 which show—still in diagram form—certain details explanatory of Figure 3, and Figure 6, which shows in diagram form a commercial process adapted for the utilization of the teachings set forth herein.

Turning now to Figure 1, we find a reaction vessel 10, in which a series of funnel-shaped partitions 11 divide the reaction vessel into a series of zones or stages 12–18 inclusive. Of these stages, stage 12 is merely a feed hopper, while stage 18 is a purging zone. Stages 13–17 inclusive, are reaction zones. Contact mass enters through pipe 19, collects in zone 12, flows therefrom through suitable distributing openings as shown in partition 11 to feed zone 13 and similarly through the descending zones in series to pass finally into zone 18 where it encounters a purging medium introduced through pipe 19', distributed by member 20 and withdrawn from the free space in the upper portion of zone 18 by pipe 21. Spent catalyst mass is withdrawn from the reactor by pipe 22. Obviously each of the zones 18 and 12 may be separated physically from the reaction chamber or their place taken by other devices, since the real construction with which we are here concerned is that of the successive chambers 13–17 inclusive. Reactants in vapor phase at reaction temperature originating in pipe 23 are distributed through pipes 24 equipped with control valves 24' to appropriate distributing channels or other devices 25 at the bottom of each reaction zone. These distributing devices may take any effective form, a simplified form being that of an inverted channel around the bottom edges of which the vapor must flow, and these bottom edges may be serrated, as shown, or plain. Reacted vapors leave through pipes 26 from the free space at the upper extremity of each chamber, are collected in pipe 27 and passed to a cyclone separator or other form of solid-from-vapor separation device 28 and then pass through line 29 to fractionation or other disposal, separated contact mass being returned to the system through pipe 30, if desired. In this multi-stage reactor it will be noted that in each conversion stage or zone there is supplied a bed of reactant material through which the vaporous reactants must pass. A greater uniformity of utilization of contact mass may be maintained by varying the space velocity in each contacting zone. This may be done by varying the amount of reactant charged to each contacting zone. This operation has advantages over any operation wherein a uniform amount of reactants pass in countercurrent throughout the length of a uniformly moving amount of contact mass material. Some of these advantages arise from physical factors inherent in a design of this type. For example, where vapors are passed uniformly upwardly through a descending column of contact mass, the pressure drop for the entire height of column is a governing factor on the operation. Also with high space velocities in such a column, it is necessary to avoid "boiling" of the contact mass with consequent channeling and inefficient contact mass utilization. In order to avoid these, it has been usual in many such operations to operate in a column packed with void-forming material such as, for example, alternate layers of perforated angle irons assembling with their angles pointing upwards in order to increase the percentage of voids in the column and to uniformly distribute them to permit high space velocities. When this is done, however, greater reactor volume is necessary to secure such a complete diffusion of reactant into contact mass as is desirable for complete utilization of contact mass. In the presently discussed operation and apparatus, complete diffusion can be effected in relatively smaller volume of reactor because the column is solid. High pressure drops can be avoided because any individual zone or stage does not represent a particularly great depth of contact mass for the reactants to penetrate. Satisfactory space velocities can be attained while maintaining relatively low pressure drop because the reactants are treated portion by portion and all are not compelled to pass through a single horizontal cross section of a reactor as in the other method.

In view of the varying activity of the contact mass, a more convenient form of this apparatus is that which is shown in Figure 2. Before considering this figure, we will recall the fact that the activity of the contact mass decreases as it passes through each succeeding stage, even if all stages were at the same temperature. We will also recall that the residual heat remaining in the contact mass after regeneration is called upon to supply a certain portion of the endothermic heat of reaction resulting in a decrease in contact mass temperature as it passes from zone to zone, further decreasing the activity. In Figure 1, adjustment for contact mass utilization was effected by adjusting the space velocity in each one of a series of similar zones or stages by varying the amount of reactant fed thereto. In Figure 2 it will be noted that the apparatus is in all details except one the same as that of Figure 1, but that the depth of contact mass material in each of the several zones or stages 13–17 inclusive, expressed by dimension lines A–E inclusive, increases; that is, the bed in zone 14 is deeper than that in 13; 15 is deeper than 14, and so on. With any known contact mass material these relations can be sufficiently well determined, based upon the relative activity of the contact mass, at the time that the reactor is designed, and once such adjustments in stage depth are made, the reactant can thereafter be flowed in equal amounts through each of pipes 24 to give space velocities in each zone designed to best utilize the activity of the contact mass present in that zone.

In Figure 3, there is shown in diagram form a slightly modified equivalent of the reactor stages of Figures 1 and 2. As will be understood after the drawing is read, this equipment may be described as a stage-in-stage equipment in which the same objectives of varying contact mass bed depth with varying space velocities achieved by equal distribution of reactants is shown.

In Figure 3, 31 is a shell of a reactor in which there are shown three groups of stages of varying depths, the stages within each group being of the same depth. Contact mass material will be fed to reactor 31 through a feed inlet 32 and when spent will be removed from the bottom thereof though outlet 33. Reactants entering through a manifold 34 will be distributed through each of pipes 35 to enter each group of stages. Reacted vapors will be removed from each stage through pipes 36 and passed by manifold pipe 37 to a collector and return device 38, as in Figures 1 and 2, before being removed to further processing through pipe 39. The internal construction of each section or group of stages is the same except for spacing, as may be seen from the drawings. In each of these sections, there is a group of vapor distributor boxes 40 at the bottom of the section which vapor distributor boxes are alternated with vapor pick-up boxes 41, as may be noted. Each of the vapor distributor boxes communicates externally of shell 31 with pipe 35. Turning to Figure 5, a more clear idea of the vapor distributor and vapor pick-up boxes may be obtained, there being shown in this figure a single pair of boxes comprising a vapor distributor box 40 and a vapor pick-up box 41. These boxes in cross section are of the general shape of a laterally compressed hexagon, being formed of sheet metal. The general purpose of this is that a series of boxes together form both a retarding and a distributing means for the contact mass flowing downwardly between them, thus assisting to maintain a solid column of contact mass above them and also effectively re-distributing the contact mass for passage through succeeding portions of the apparatus. Vapor distributor boxes 40 communicate externally through shell 31 with reactant supply pipe 35. Vapor pick-up boxes 41 do not communicate with anything in the way of an external pipe. Their volume is largely for the purpose of matching the vapor distributor boxes in the contact mass distributing function. Extending upwardly from each vapor distributor box there is a pipe 42. At intervals along this pipe there are transversely mounted vapor distributing channels 43 which may conveniently take the form of an angular trough, mounted apex up. In pipe 42 under each of these channels 43, there is an orifice 44. The upper ends of pipes 42 are closed at 45. Extending upwardly from each of the vapor pick-up boxes 41 there is a pipe 46. On each of pipes 46 at intervals alternating with the spacing of distributor channels 43 on pipes 42, there are vapor pick-up channels 47 and under them orifices 48 in pipes 46. Turning again to vapor pick-up boxes 41, it will be noted that this is not of exactly the same construction as box 40 but is provided on each of its shoulders with a slot 49 which will also function as a vapor pick-up channel and orifice. A slot 50 is provided in the bottom of boxes of each type partly for purposes of vapor transfer and partly to permit discharge of any contact mass material which might adventitiously enter from upper portions of the structure. The flow through the system is effectively shown by arrows in Figure 5. Contact mass material, as indicated by the stippled area, flows downwardly around the tubes and channels and through between the boxes. Reactant vapors entering box 40 pass upwardly through pipe 42, a portion leaving through orifices 44 and passing out to pass under distributor channel 43 and from thence to diffuse into the contact mass passing therethrough both upwardly and downwardly until it is able to enter the space under the collector channel 47 and pass therefrom into a pipe 46 through which it flows upwardly. As will be noted, slot 49 in box 41 serves the purpose of a collector channel like 47 for the lowermost portion of the contact mass. In this form of apparatus, the contact mass between any distributor channel 43 and the next adjacent collector channel 47 constitutes a reaction stage. It will be noted from this, that the apparatus of Figure 3 is composed of three groups of stages, the stage depth remaining the same within any group but increasing from group to group as the contact mass activity decreases. This then gives in a rather compact and simple commercial design an equivalent of the structure of Figure 2 in a form that is practicable for the handling of commercially large volumes of reactants.

To understand the details at the top of each group of stages, we will turn to Figure 4 wherein we find again distributor pipes 42 with their distributor channels 43 and orifices 44 and collector pipes 46 with their collector channels 47 and orifices 48. It will be noted that this view is an internal view taken at right angles to the plane of Figure 3 and at a level as indicated by the figures 4—4 near the upper left hand side of Figure 3. Distributor pipes 42 are closed at their tops, as indicated at 45. Collector pipes 46 extend into a trough member 51 which trough member together with a hood member 52 makes up a duct 53 whereby reacted vapors may be collected from the several tubes 46 and led to pipe 36 external of casing 31. Between trough 51 and hood 52, there is supplied a slot 54 to act as the uppermost collecting channel of the group. The ducts 53 again have the cross section shape of a laterally compressed hexagon and are so spaced as may be seen from Figure 4 to provide both a retarding and a distributing means for the contact mass flowing downwardly around and between the ducts 53 and into the group of reaction stages below. The retarding function of ducts 53 is taken advantage of by providing in reactor 31, for example, at 55, a spacing, between the group of boxes 40 and 41 defining the bottom of a group of stages and the group of ducts 53 forming the top of a subsequent group of stages, wherein a relatively solid mass of contact mass may be held to provide a means for isolating group from group.

In Figure 6 there is shown in diagram form a setup of apparatus for practicing a unitary process for the continuous utilization and regeneration of contact mass in connection with the cracking of petroleum hydrocarbons embodying the teachings herein set forth. In this figure, 56 is a reactor, comprising a feed zone 57, several conversion stages 58 and a purge stage 59. Contact mass material in particle form, catalytic to the reaction being conducted, passes serially through these stages, the reactor shown being similar to that shown in Figure 2. Charge material, a high boiling hydrocarbon to be converted to gasoline, enters the system by pipe 60, passes through furnace 61 where it is heated to reaction temperature, passes through separator 62 where material not vaporous at the reaction temperature is removed, and thence, through manifold 63 and the several inlets 64 is introduced to each of the reactor stages. Conversion products, removed from each of the reaction stages through pipes 65, pass through manifold 66, catalyst separator 67 and thence through pipe 68 to fractionator 69, to be separated into product withdrawn through 70 and unconverted material or recycle withdrawn through 71.

Spent catalytic contact mass material is removed through zone 59, wherein it is purged by an inert vapor such as steam, introduced at 72 and withdrawn at 73.

Spent and purged contact mass material from 54 is taken by elevator 74 and discharged into regenerator 75.

Regenerator 75 is constructed generally in accordance with the teachings of our application Serial Number 447,433, filed June 17, 1942, and consists of a feed zone 76, a series of regeneration stages 77 to 81 inclusive, and a purge section 81'. The general features are quite similar to the reactor 54. In each regeneration stage there is an air inlet 82, an air distributor 83, and an air outlet 84 whereby regenerator fume is collected in manifold 85 to pass through separator 86 and leave the system through 87. Air or other regenerating medium is supplied through pipe 88. Also, in each regenerator stage, below the air inlet distributor 83, there is a cooling coil 89 through which water, molten salt, or other fluid heat transfer medium may be passed to control the temperature of the contact mass leaving the regeneration stage. Heat transfer medium is supplied through 90 and removed through 91.

Purging after regeneration is accomplished in 81' by an inert, such as steam, introduced through 92 and removed through 93.

Regenerated contact mass material is returned to reaction through elevator 94.

While we prefer this form of regenerator, we may use any form of regenerator capable of restoring contact mass to high activity. We also prefer that the temperature control in the regeneration process be such that the regenerated contact mass may be returned to reaction with sufficient residual heat to supply at least a portion of the endothermic heat of the conversion reaction.

When coupled together, the reaction procedure here disclosed and the stepwise regeneration procedure give a process of new and unexpected capabilities. The more effective contact mass utilization of the reaction procedure permits proper utilization of the high activity contact mass, coupled as well with the ability to completely utilize contact mass, to work to relatively good levels of carbon deposit and to properly utilize residual heat of regeneration, while the regeneration procedure is uniquely capable of speedy and effective regeneration of the completely utilized contact mass to a degree not attainable on such mass with other methods known to us, and is also capable of coupling a clean burn of such a mass with a return of that mass to reaction at an effective residual heat level.

As an example of the application of a device of this kind to commercial operations, there may be visualized a reactor containing thirty stages divided into three groups each containing ten stages, in the first of which the spacing between distributor channels would be 12 inches giving an equivalent stage depth of 6 inches; in the second of which the space between distributor channels would be 18 inches giving an equivalent depth of 9 inches and in the third of which the distributor channel spacing would be 2 feet giving an equivalent stage depth of 12 inches.

In many cases it will probably be better design to use a larger number of groups with lesser differences between each group, thus more nearly approaching the operating conditions set forth in Figure 2.

A similar conception of actual operating design may be expressed for a three group reactor in terms of space velocity, gasoline yield, permanent gas make, weight per cent coke based on charge and weight per cent carbon deposited on clay according to the following table:

in each of the several stages in spite of the variance of activity of the contact mass between stages. This principle enables a very considerably more effective, uniform, and complete use of the capability of the contact mass material. It will further be noted that these abilities arise to a considerable extent from an ability to secure complete and completely controlled diffusion of reactants through a moving contact mass coupled with low over-all pressure drops which have not heretofore been present in operations used for this purpose.

We claim:

1. In a contacting apparatus, means defining a substantially vertical chamber, a plurality of substantially horizontal deflectors each comprising means defining an inverted trough, said deflectors being arranged in a plurality of substantially parallel vertical series, means to admit fluid to the under side of deflectors of alternate series and means to withdraw fluid from under the deflectors of each other series, the vertical distance between successively lower deflectors of each series being progressively greater.

2. In a contacting apparatus, means defining a substantially vertical chamber, a plurality of inlet deflectors arranged in a horizontally spaced plurality of vertical series in said chamber, a plurality of outlet deflectors arranged in a series parallel to and between each two series of inlet deflectors, a plurality of vertical inlet tubes passing through each deflector of each series of inlet deflectors, a plurality of vertical outlet tubes passing through each deflector of each series of outlet deflectors, each of said tubes being perforated to provide communication between the interior thereof and the space below each deflector through which it passes, duct means to admit fluid to each of said inlet tubes and duct means to withdraw fluid from each of said outlet tubes, the vertical distance between successively lower deflectors of each series being progressively greater.

3. In a contacting apparatus, means defining a substantially vertical chamber enclosing a plurality of contact zones each comprising a plurality of inlet deflectors arranged in a plurality of vertical series in said chamber, a plurality of outlet deflectors arranged in a series parallel to and between each two series of inlet deflectors, a plurality of vertical inlet tubes passing through each deflector of each series of inlet deflectors, a plurality of vertical outlet tubes passing through each deflector of each series of outlet deflectors,

*Table I*

| Group | Units of oil charged to group | Charged total | Space velocity | Gasoline per cent/vol. | Gas per cent/wt. | Coke per cent/wt. based on charge formed in group | Coke per cent/wt. on contact mass leaving group |
|---|---|---|---|---|---|---|---|
| Top | 100 | | 1.5 | 45 | 4 | 4.8 | 1.0 |
| Middle | 100 | | 1.0 | 43 | 4.5 | 1.5 | 1.3 |
| Bottom | 100 | | .5 | 42 | 5.0 | .9 | 1.5 |
| Totals | | 300 | | | | | 1.5 |
| Averages | | | 1.0 | 43.3 | 4.5 | 2.4 | |

It may be seen that all of these designs herein shown have one thing in common, namely, a capability of conducting an operation wherein a contact mass is passed serially through a number of stages in each of which stages it is contacted with a reactant vapor in amounts and at rates designed to secure relatively uniform conversion each of said tubes being perforated to provide communication between the interior thereof and the space below each deflector through which it passes, duct means to admit fluid to each of said inlet tubes and duct means to withdraw fluid from each of said outlet tubes, one of said duct means comprising a plurality of parallel horizontal ducts each having a hexagonal cross-section with one axis vertical whereby the horizontal ducts are adapted to distribute solid particles passing therebetween, the vertical distance between successively lower deflectors of at least one of said series being progressively greater.

4. In a contacting apparatus, means defining a substantially vertical chamber, in such chamber a plurality of vertically superimposed gas-solid contacting groups, each group comprising a plurality of substantially horizontal deflectors each comprising means defining an inverted trough, said deflectors being arranged in a plurality of substantially parallel vertical series, each of said deflectors being disposed on a horizontal level intermediate the horizontal levels of adjacent deflectors of an adjacent series of deflectors, means to admit fluid to the under side of deflectors of alternate series and means to withdraw fluid from under the deflectors of each other series, the distance between horizontal levels of deflectors of one series and deflectors of an adjacent series being progressively greater in each group toward the bottom of said chamber.

5. In a contacting apparatus, means defining a substantially vertical chamber, in such chamber a plurality of vertically superimposed gas-solid contacting groups, each group comprising a plurality of inlet deflectors arranged in a horizontally spaced plurality of vertical series in said chamber, a plurality of outlet deflectors arranged in a series parallel to and between each two series of inlet deflectors, each of said deflectors comprising means defining an inverted trough, a plurality of vertical inlet tubes passing through each deflector of each series of inlet deflectors, a plurality of vertical outlet tubes passing through each deflector of each series of outlet deflectors, each of said tubes being perforated to provide communication between the interior thereof and the space below each deflector through which it passes, each of said outlet deflectors being disposed on a horizontal level intermediate the horizontal levels of adjacent inlet deflectors of an adjacent series of inlet deflectors, duct means to admit fluid to each of said inlet tubes and duct means to withdraw fluid from each of said outlet tubes, the distance between horizontal levels of adjacent inlet and outlet deflectors being progressively greater in each group toward the bottom of said chamber.

6. A method of contacting a particle-form solid with a gaseous reactant comprising passing the solid as a continuously moving substantially solid confined stream through a contact zone, maintaining two series of open channels in said solid stream transversely of said contact zone, openings of one series being longitudinally displaced along the stream from openings of the second series, introducing gaseous reactant to the solid from openings of one series, passing the gaseous reactant longitudinally through the solid of said stream, and removing it through openings of the second series, the said longitudinal displacement between channels of the admission series and channels of the removal series being progressively greater in the direction of movement of said stream.

7. A method of contacting a particle-form solid with a gaseous reactant comprising passing the solid as a continuously moving substantially solid confined stream through a plurality of serially located contacting zones, and in each contacting zone maintaining two series of open channels in said solid stream, the series being spaced transversely of said contact zone, openings of one series being longitudinally displaced along the stream from openings of the second series, introducing gaseous reactant to the solid from openings of one series, passing the gaseous reactant longitudinally through the solid of said stream, removing it through openings of the second series, at each end of each contact zone maintaining a well packed moving column of solid of length sufficient to minimize passage of gaseous reactant from one contact zone to another, the said longitudinal displacement between inlet and outlet channels being progressively greater for each contacting zone in the direction of movement of said stream.

8. In a contacting apparatus, means defining a substantially vertical chamber, a plurality of vertically spaced groups of substantially horizontal deflectors within said chamber, each deflector comprising means defining an inverted trough; and each group comprising a plurality of inlet deflectors arranged in a horizontally spaced plurality of vertical series in said chamber, and a plurality of outlet deflectors arranged in vertical series parallel to and between each two series of inlet deflectors; each of said outlet deflectors being disposed on a level intermediate the levels of the adjacent inlet deflectors of an adjacent series of inlet deflectors and the vertical distances between adjacent inlet and outlet deflectors in any group being substantially equal but progressively increasing with each group toward the bottom of said chamber; in each group a plurality of vertical inlet tubes passing through each deflector of each series of inlet deflectors; in each group a plurality of vertical outlet tubes passing through each series of outlet deflectors; each of said tubes being perforated to provide communication between the interior thereof and the space below each deflector through which it passes, duct means to admit fluid to each of said inlet tubes and duct means to withdraw fluid from each of said outlet tubes, one of said duct means comprising a plurality of parallel horizontal ducts having gable-roofed cross-sectional shape and spaced horizontally apart so as to distribute solid particles passing therebetween.

9. The method for conducting reactions involving a reactant fluid in the presence of a moving particle form solid material which comprises: passing said solid material through a confined conversion zone as a substantially compact, continuous column of moving solid particles, passing separate portions of the same reactant fluid in a substantially longitudinal direction through a plurality of sections of said column arranged longitudinally along the length thereof, the fluid in each of said sections passing between fluid inlets and outlets spaced apart predetermined distances, which predetermined distances are progressively greater in each of said sections beginning with the first of said sections in the direction of solid movement.

10. A unitary process for the conversion of hydrocarbons in the presence of a contact mass which is contaminated thereby and for the regeneration and return to reaction of said contact mass comprising the steps: moving a flowing stream of contact mass in a cyclic path including reaction and regeneration steps while maintaining said contact mass in a heated condition; in the reaction step passing said contact mass through a confined zone as a substantially compact continuous column of moving particles, passing separate portions of hydrocarbon reactant fluid in a substantially longitudinal direction through a plurality of sections of said column arranged longitudinally along the length thereof, the fluid in each of said sections passing between fluid inlets and outlets spaced apart longitudinally in said sections predetermined distances, which distances are progressively greater in each of said sections beginning with the first of said sections in the direction of solid movement, thereby effecting the conversion of said hydrocarbons and causing deposition of combustible contaminant upon said contact mass; in the regeneration step removing the contaminant from the contact mass by burning at temperatures above the ignition temperature of the contaminant and below temperatures damaging to the contact mass by passing said contact mass through a confined zone as a substantially compact continuous column of moving particles, passing separate portions of oxidizing gas in a substantially longitudinal direction through a plurality of sections of said column spaced apart longitudinally along the length of said column, the fluid in each of said sections passing between fluid inlets and outlets spaced apart longitudinally in said sections predetermined distances, which distances are progressively greater in each of said sections beginning with the first of said sections in the direction of solid movement, and removing heat from said column at locations located between said last named sections to maintain a temperature control.

11. In a gas-solid contacting apparatus: means defining a substantially vertical elongated chamber, means to admit particle form solid to the upper end of said chamber, means to withdraw solid material from the lower end thereof, a plurality of vertically spaced groups of substantially horizontal deflectors, each deflector comprising means defining an inverted trough, said deflectors in each group being arranged in a plurality of substantially parallel vertically extending series spaced apart side by side across said chamber, each of said deflectors being disposed on a level intermediate the level of adjacent deflectors of an adjacent series of deflectors and the vertical distances between the deflectors of a given series and that of an adjacent series in the same group being greater for each successive group beginning with the uppermost group, said vertically spaced groups of deflectors being spaced vertically apart a substantially greater vertical distance than the vertical distance between adjacent deflectors in any adjacent group thereof, separate means for each group of deflectors to admit contacting fluid to the under side of deflectors of alternate vertical series and separate means for each group of deflectors to withdraw fluid from the deflectors of each other vertical series.

12. The method of conducting fluid-solid contacting operation which comprises: passing a mass of solid particles downwardly through a plurality of superposed contacting zones as a continuous, substantially compact column, separately introducing a fluid into each contacting zone at a series of locations extending transversely across portions of said column within that zone and separately withdrawing fluid from each contacting zone from a second series of locations extending transversely across portions of said column within that zone, said fluid withdrawal locations being longitudinally displaced along said column from said fluid introduction locations and the distances betwen adjacent fluid introduction locations and fluid withdrawal locations progressively increasing for each successive zone beginning with the uppermost zone.

THOMAS P. SIMPSON.
JOHN W. PAYNE.
LOUIS P. EVANS.